(12) United States Patent
Lewandowski (10) Patent No.: US 10,139,519 B2
(45) Date of Patent: Nov. 27, 2018

(54) METHOD FOR AUTOMATED ROCK PHYSICS MODELING

(71) Applicant: Jerome Lewandowski, Houston, TX (US)

(72) Inventor: Jerome Lewandowski, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 1040 days.

(21) Appl. No.: 14/521,558

(22) Filed: Oct. 23, 2014

(65) Prior Publication Data

US 2015/0161303 A1    Jun. 11, 2015

(51) Int. Cl.
 *G06F 17/50* (2006.01)
 *G01V 99/00* (2009.01)

(52) U.S. Cl.
 CPC .................... *G01V 99/005* (2013.01)

(58) Field of Classification Search
 CPC ............................................. G06F 17/5018
 USPC .............................................. 703/2
 See application file for complete search history.

(56) References Cited

U.S. PATENT DOCUMENTS

| | | | |
|---|---|---|---|
| 9,696,442 B2* | 7/2017 | Li | G01V 1/306 |
| 2013/0013209 A1* | 1/2013 | Zhu | G01N 33/24 |
| | | | 702/6 |
| 2014/0095131 A1* | 4/2014 | DiCaprio | G01V 11/00 |
| | | | 703/2 |
| 2014/0257780 A1* | 9/2014 | Jing | G01V 99/005 |
| | | | 703/6 |

OTHER PUBLICATIONS

Liu, E. et al, "Carbonate Rock Physics Issues", IPTC 13850, International Petroleum Technology Conference, Dec. 7-9, 2009, pp. 1-5, Doha, Qatar.
Xu, S. et al, "Carbonate Rock Physics: Analytical Models and Validations Using Computational Approaches and Lab/Log Measurements", IPTC 11308, International Petroleum Technology Conference, Dec. 4-6, 2007, pp. 1-10, Dubai, U.A.E.
Zhu, Y. et al, "Improved Rock-Physics Model for Shale Gas Reservoirs", 2012 SEG Las Vegas 2012 Annual Meeting, Nov. 4-9, 2012, pp. 1-5, Las Vegas, NV.
Khazanehdari, J. et al. (2010), "The next generation of rock physics models," E&P Magazine, 3 pgs.

* cited by examiner

*Primary Examiner* — Andy Ho
(74) *Attorney, Agent, or Firm* — ExxonMobil Upstream Research Company—Law Department (57) ABSTRACT

A computer-implemented method for automated rock physics modeling. The method includes the steps of (a) pre-processing data obtained from a suite of logging tools over a range of depths; (b) using an automated, computer-implemented procedure to determine a solution to an inverse problem associated with the rock physics model using the data from step (a), the solution including a list of optimal parameters; (c) performing a forward run of the rock physics model; and (d) computing a set of rock mechanical properties using the optimal parameters obtained in step (b). A computer program product for automated rock physics modeling is also provided.

38 Claims, 6 Drawing Sheets

METHOD FOR AUTOMATED ROCK PHYSICS MODELING

CROSS REFERENCE TO RELATED APPLICATIONS

This application claims the benefit of U.S. Provisional No. 61/914,739, filed Dec. 11, 2013, which is incorporated herein in its entirety for all purposes.

FIELD

The present disclosure relates to an automated method of modeling the mechanical properties of rock based on advanced rock physics models.

BACKGROUND

As hydrocarbon reservoirs are easily harvested, including those oil reservoirs on land or located in shallow ocean water, are depleted, other hydrocarbon sources must be employed to meet energy demands. Such reservoirs may include any number of unconventional hydrocarbon sources, such as biomass, deep-water oil reservoirs, and natural gas from other sources. One such unconventional hydrocarbon source is natural gas produced from shale, termed "shale gas."

The access and extraction of unconventional resources require the development of advanced technologies such as, for example, the process of hydraulic fracturing in low-permeability rocks, as it is the case for shale gas bearing rocks. In turn the development of novel technologies require an accurate knowledge of rock mechanical properties, say Poisson's ratio, bulk and shear moduli, etc. Currently quantitative analysis of rock mechanical properties are typically obtained through correlations (which are field dependent) and/or input from subject matter experts; however such a quantitative process is mediocre at best (with concurrent impact of the predictive capabilities of, say, hydraulic fracturing modeling).

In order to improve the quality of predictions of rock mechanical properties a suite of advanced rock physics models have been developed over the past two decades. These advanced rock physics models are based on first-principles and are therefore complex to solve for the rock mechanical properties of interest.

Current quantitative characterization of rock mechanical properties are mostly based on field dependent correlations combined with data obtained from logging tools. When rock physics models are actually used (in association with data from logging tools), the actual solution of the inverse problem associated with these models is done by the practitioner (geophysicist or engineer) by manually adjusting a host of physical parameters; once the difference between known data (obtained from the logging tools) and the predicted data is deemed to be in approximate agreement, the parameters are used once more into the rock physics model to obtain the rock mechanical properties (which are the quantities of interest).

The current approach has serious flaws; first it assumes that the inverse problem mentioned above has been solved appropriately by simple visual comparison between known data (from logging data) and predicted data (that obtained from the forward model); second it requires a significant expertise from the practitioner (therefore limiting its range of application); third it is not accurate (sometimes grossly inaccurate). The accuracy can, and usually has, a significant impact on inferred rock mechanical properties and, in turn, can seriously affect, through a non-linear, amplifying feedback loop, the predictive capabilities of novel advanced technologies (hydraulic fracturing, for example).

Despite these advances, there exists a need to address problems the aforementioned problems and issues. Therefore, what is needed is an improved computer-implemented method for automated rock physics modeling.

SUMMARY

In one aspect, disclosed herein is a computer-implemented method for automated rock physics modeling. The method includes the steps of (a) pre-processing data obtained from a suite of logging tools over a range of depths; (b) using an automated, computer-implemented procedure to determine a solution to an inverse problem associated with the rock physics model using the data from step (a), the solution including a list of optimal parameters; (c) performing a forward run of the rock physics model; and (d) computing a set of rock mechanical properties using the optimal parameters obtained in step (b).

In some embodiments, the data obtained from the suite of logging tools form a set of logs that include one or more of bulk density, total organic content (TOC), porosity, normalized volume of shale, shear wave transit time, and water saturation. In some embodiments, the set of logs form auxiliary information for the rock physics model.

In some embodiments, the step of pre-processing data obtained from the suite of logging tools includes determining which depth ranges possess all required auxiliary information for the rock physics model.

In some embodiments, the step of pre-processing data obtained from the suite of logging tools includes a data filtering step. In some embodiments, the step of pre-processing data obtained from the suite of logging tools includes the step of coarsening the auxiliary information and the data obtained from the suite of logging tools to decrease the time required to conduct step (b).

In some embodiments, the rock physics model defines an associated inverse problem. In some embodiments, the solution of the inverse problem defines a set of optimal parameters.

In some embodiments, prior to step of determining a solution to the inverse problem associated with the rock physics model, the set of optimal parameters is divided into subsets. In some embodiments, the number and choice of parameters belonging to each subset is selected with reference to the physics of the rock physics model. In some embodiments, the number and choice of parameters belonging to each subset is selected by a computer implemented dynamic, numerical process.

In some embodiments, the step of determining a solution to the inverse problem associated with the rock physics model is separately conducted on each subset of parameters to form a set of local inversions.

In some embodiments, the step of determining a solution to the inverse problem associated with the rock physics model comprises an inversion method selected from the a Monte Carlo based method, or a Bayesian-type method, or a combination of thereof.

In some embodiments, a pre-defined sequence of local inversions is conducted to obtain an overall solution to the inverse problem.

In some embodiments, the forward run of the rock physics model is conducted using a set of optimal parameters and auxiliary information that has not been subjected to a step of coarsening.

In some embodiments, the rock mechanical properties are computed at all depth ranges having auxiliary information. In some embodiments, the rock mechanical properties include Poisson ratio, bulk modulus and shear modulus.

In another aspect, disclosed herein is a computer program product for automated rock physics modeling. The computer program performs the steps of: (a) pre-processing data obtained from a suite of logging tools over a range of depths; (b) determining a solution to an inverse problem associated with the rock physics model using the data from step (a), the solution including a list of optimal parameters; (c) performing a forward run of the rock physics model; and (d) computing a set of rock mechanical properties using the optimal parameters obtained in step (b), the computer program product including one or more computer readable instructions embedded on a tangible computer readable medium and configured to cause one or more computer processors to perform the steps described above and transmitting information relating to the steps described above over a communications link.

DETAILED DESCRIPTION

FIGS. 1-6 provide illustrative, non-exclusive examples of a computer-implemented method for automated rock physics modeling, and applications thereof, according to the present disclosure, together with elements that may include, be associated with, be operatively attached to, and/or utilize such a computer-implemented method for automated rock physics modeling.

In FIGS. 1-6, like numerals denote like, or similar, structures and/or features; and each of the illustrated structures and/or features may not be discussed in detail herein with reference to the figures. Similarly, each structure and/or feature may not be explicitly labeled in the figures; and any structure and/or feature that is discussed herein with reference to the figures may be utilized with any other structure and/or feature without departing from the scope of the present disclosure.

In general, structures and/or features that are, or are likely to be, included in a given embodiment are indicated in solid lines in the figures, while optional structures and/or features are indicated in broken lines. However, a given embodiment is not required to include all structures and/or features that are illustrated in solid lines therein, and any suitable number of such structures and/or features may be omitted from a given embodiment without departing from the scope of the present disclosure.

Figure 1:
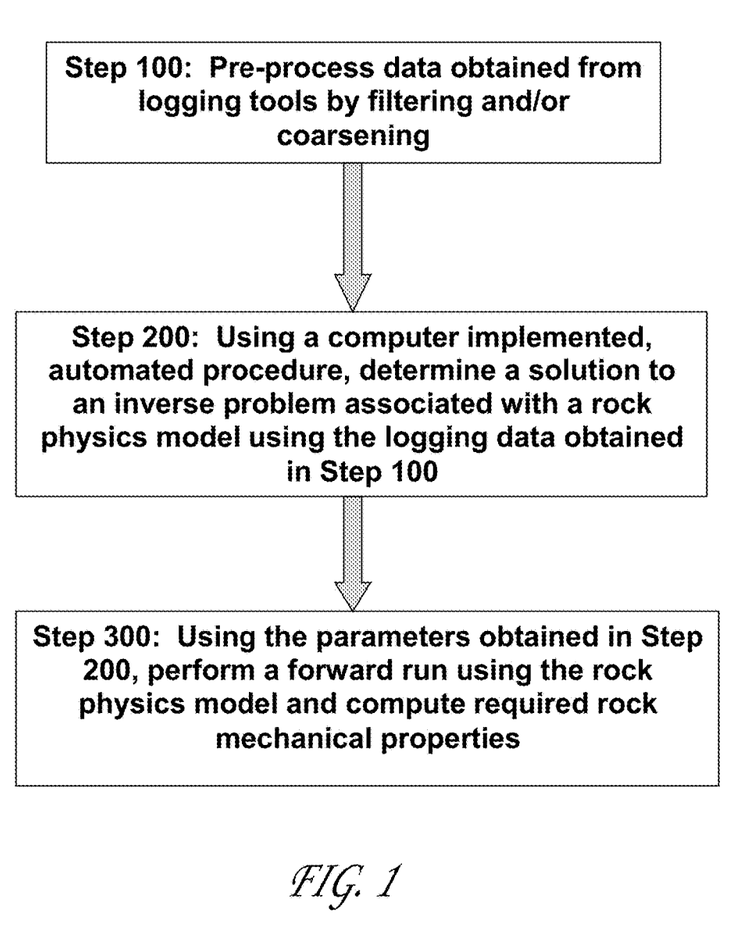
FIG. 1 presents a flowchart of an illustrative, non-exclusive example of a computer-implemented method for automated rock physics modeling, according to the present disclosure.

Referring now to FIG. 1, a flowchart of an illustrative, non-exclusive example of a computer-implemented method for automated rock physics modeling, according to the present disclosure, is presented. As shown, in Step 100, data obtained from a suite of logging tools obtained over a range of depths is pre-processed. In Step 200, a solution to an inverse problem associated with the rock physics model is determined using the data from Step 100. As disclosed herein, Step 200 is conducted using an automated, computer-implemented procedure. The solution to the inverse problem includes a list of optimal parameters. In Step 300, a forward run of the rock physics model is performed, and in Step 400, a set of rock mechanical properties is computed using the optimal parameters obtained in Step 200. Steps 100-300 will be described in more detail below.

The rock physics model uses auxiliary information (auxiliary data) measured by a suite of logging tools. The auxiliary data is presented in the form of logs. As those skilled in the art will understand, a log defines an ensemble of physical measurements for an ensemble of specific depths into the formation. The required auxiliary information depends on the rock physics model being used, typically either sandstone, carbonate or shale-gas bearing rocks; the above list providing examples of rock physics models, without limitations.

In the usual case, the auxiliary information includes water saturation, total organic content (TOC), porosity, normalized volume of shale, etc. The entire set of logs required for a given rock physics model is called the auxiliary information of that particular model.

As is often the case, the logging tool may have failed to record particular information over some depth range or ranges. Thus, the first aspect in the pre-processing of the data provided by the logging tools is to determine which depth ranges possess all the required auxiliary information. This intermediary step is often referred to as zone identification.

Once the appropriate depth range or ranges are known, a coarsening procedure is applied to the auxiliary information. The object of the coarsening procedure is to speed up the automation procedure in Step 200.

The rock physics models contemplated herein are based on first principles, depend on numerous parameters and are computationally expensive. To be of practical use, in order to compute rock mechanical properties efficiently and accurately, each rock physics model actually defines an associated inverse problem. The solution of the inverse problem defines the set of optimal parameters.

In order to determine the set of optimal parameters, an automation procedure is devised. Instead of attempting to perform the inversion all at once, the entire set of parameters is divided into subsets. The number and choice of parameters belonging to each subset is guided by the physics implied in the rock physics model, and sometimes through a purely dynamic, numerical process. The automation procedure first identifies the subsets of parameters. Depending on the number of parameters in a given subset, a different inversion method can be used. By way of example and not of limitation, the local inversion can be a Monte Carlo based method, a Bayesian-type method, or a combination of both.

An approximate or exact inversion for a given subset is called a local inversion. It is noted that during a local inversion, parameters which do not belong to the subset under consideration, are held fixed. A pre-defined sequence of local inversions is carried out until the solution to the global inverse problem is found (i.e., the list of optimal parameters is found). In order to speed up the computation, the coarsened auxiliary information and the coarsened input data obtained from Step 100 is used instead of the actual auxiliary and input information, respectively.

Once the set of optimal parameters has been determined in Step 200, a forward run of the rock physics model is carried out using the set of parameters and the original (un-coarsened) auxiliary information from the logging tools. The rock mechanical properties (e.g., Poisson ratio, bulk and shear moduli, etc.) are then computed for all the depth ranges where the auxiliary information is present, that is to say, for the zones identified using the procedure described hereinabove for Step 100.

Methodologies having utility in the method disclosed herein will now be described. Initially, the inverse problem posed by the rock physics models is defined. As disclosed hereinabove, the solution to the inverse problem relies on an automation procedure and the pre-processing of the input and auxiliary data permits the determination of the mechanical properties of the rock under consideration.

Figure 2:
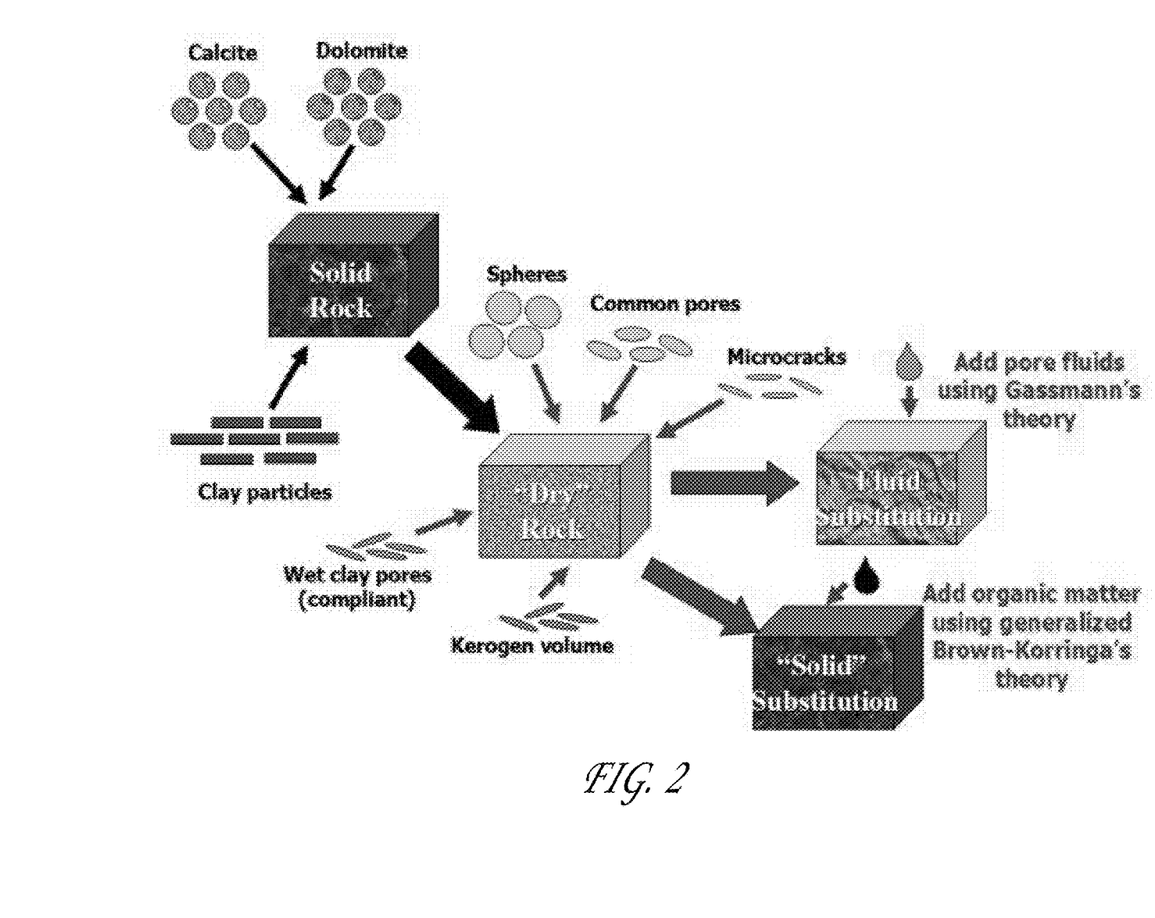
FIG. 2 presents a schematic view of an illustrative, non-exclusive example of a procedure for developing a rock physics model for the case of shale gas rock, according to the present disclosure.

Rock physics models provide the link between reservoir properties and seismic properties, which can be observed with a geophysical survey. Of specific significance are the inclusion-based micro-porosity models. These models characterize real rocks as compositions of constituent minerals and fluids with different shapes, alignments and physical properties. Referring now to FIG. 2 for the case of a shale gas rock physics model, the solid background is estimated by mixing different minerals, such as quartz, calcite, and clays, using a Reuss-Voigt-Hill averaging procedure. A dry rock frame is then formed by introducing inclusions into the solid background, where for example the inclusion space contains inter-particle pores or pores within clay.

An automation procedure for providing a solution to the inverse problem implied by a general rock physics models, wherein the details of the rock physics model are subdominant, will now be described. For the sake of generality, the rock physics model can be written in the following compact form:

$$y=R(x,\alpha,z) \qquad (1)$$

wherein: x represents a set of three input logs, namely, a bulk density log, a compressional wave velocity log and a shear wave velocity log (case 1). In some cases, where the shear wave velocity log is absent, either because it was not measured or did not containing valid data, then x represents a set of two input logs, the bulk density log and the compressional wave velocity log (case 2). The methods disclosed herein are equally suitable for both cases 1 and 2.

The list of parameters is represented by the symbol a. The specific list of parameters is model dependent (e.g., sandstone, carbonate or shale gas) and can include various components of the rock and the fluid such as quartz density, shale density, density of kerogen, aspect ratio of quartz pores, aspect ratio of shaly pores, compressional transit time for quartz and shaly components, compressional transit time in the fluid phase, etc. Depending on the complexity of the physics model being used, the number of parameters can vary from 10 to 30, or more.

The methods disclosed herein are not specific to any particular rock physics model and R(*) is a generic but highly non-linear operator. The auxiliary information, which is typically obtained from logging tool measurements, is represented by the symbol z. Generally, the water saturation log, porosity log and normalized volume of shale log form part of the auxiliary information, although more logs may be required depending on the rock physics model being considered.

Finally the symbol y denotes the set of computed (or output) logs, for example a computed bulk density log, computed compressional wave velocity log and computed shear wave velocity log, for case 1. For case 2, y represents the set formed by the computed bulk density log and the compressional wave velocity log.

A forward run is defined as the application of Eq. (1) from right to left, that is given a set of input logs, x, and a set of auxiliary logs, z, as well as a set of parameters, a, a set of computed logs, y. Given a set of input and output logs (x,y) we can define an error norm as in Eq. (2)

$$E=E(x,y) \qquad (2)$$

It should be noted that E is always a non-negative quantity, but can be zero when x=y. The specific form of the function E is not critical, but it must satisfy some key requirements. Introducing $r \propto \|x-y\|$, where $\|*\|$ denotes an appropriate positive norm, the functional form of E must satisfy the following requirements:

[1] it must finite and positive for finite r;
[2] it must monotically decrease with decreasing r;
[3] it must vanish if and only r vanishes.

The inverse problem suggested by Eq. (1) can be broadly stated as follows: find the set of optimal parameters $\alpha_{opt}$ such that the associated error $E_{min}$ is minimal. In practice $E_{min}$ is never zero as there is always some noise in the input and auxiliary data; the noise in the sets of logs x and z is amplified due to the highly non-linear nature of operator R(*).

The first step in the pre-processing of the input data and auxiliary data consists in ensuring that the depth range (or depth ranges) under consideration contain the required information needed for the rock physics model. The required information is the set q={x,z} as shown in Eq. (1). It should be noted that the parameters α are provided by the user, manually or through an automated procedure. Each log of the set q is first considered individually; each entry of the log for which the data is absent, or for which the data is deemed invalid, is recorded, such an instance is denoted a NULL entry. Then the entire information pertaining to the entire set q is processed to determine the list of collective list of NULL entries.

Once the NULL entries have been identified they are taken out of consideration from the inverse problem outlined in Eq. (1). If $N_0$ denotes the number of collective NULL entries and $N_{tot}$ is the total number of entries in the original logs (i.e. the number of entries before the pre-processing step), then the number of non-NULL entries considered in the inverse problem is $N=N_{tot}-N_0$. Below we also refer to N as the number of active nodes.

Figure 3:
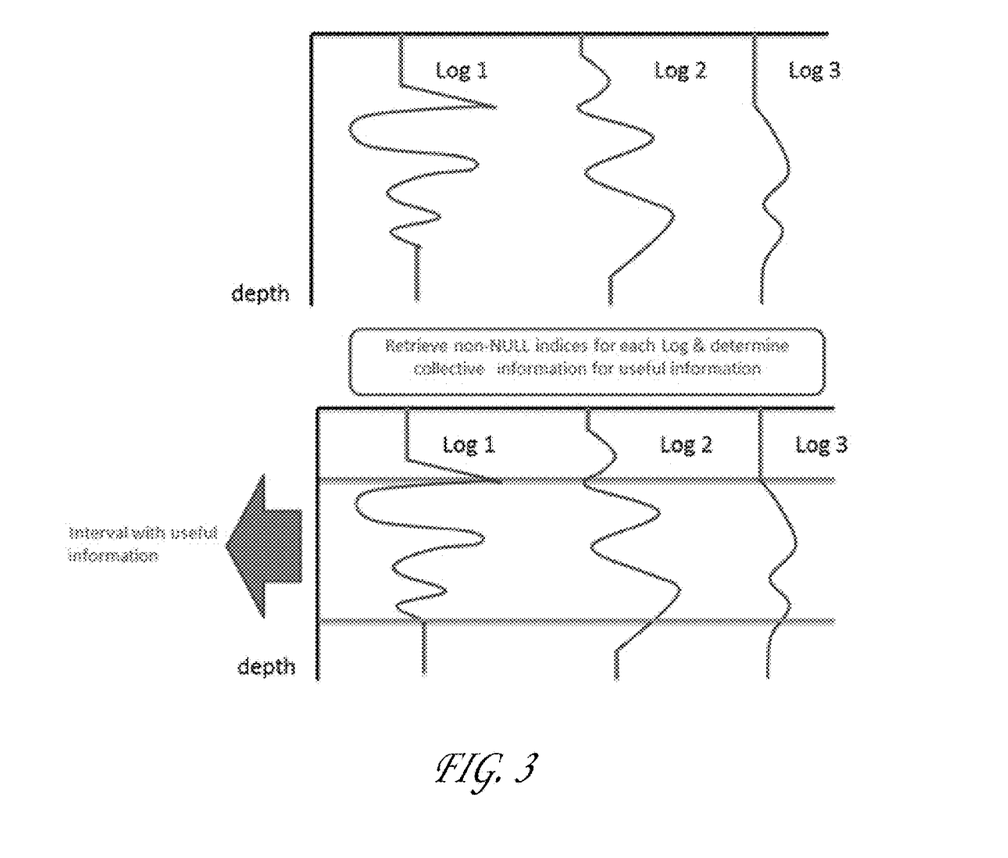
FIG. 3 presents a schematic view of an illustrative, nonexclusive example of a pre-processing step for the removal of NULL entries for collective information associated with three logs, according to the present disclosure.

FIG. 3 illustrates the pre-processing step of removing the NULL entries for the collective information associated with three logs. The straight-line segments indicate regions where the data is not valid, and the other segments represent valid data. The arrow shows the valid interval.

The second step of data pre-processing is a data coarsening step. As mentioned, this step is required in order to speed up the computation of the forward problem Eq. (1).

The set of active nodes is divided into M subsets, which also may be referred to as zones. Consider a single log s, with N active nodes. The corresponding coarsened log, denoted $s_c$, can be obtained by averaging a set of N/M entries of s to form a single entry of S. The averaging method disclosed herein is an arithmetic averaging method, although the final quality of the solution of the inverse problem is virtually independent of the averaging method used.

Figure 4:
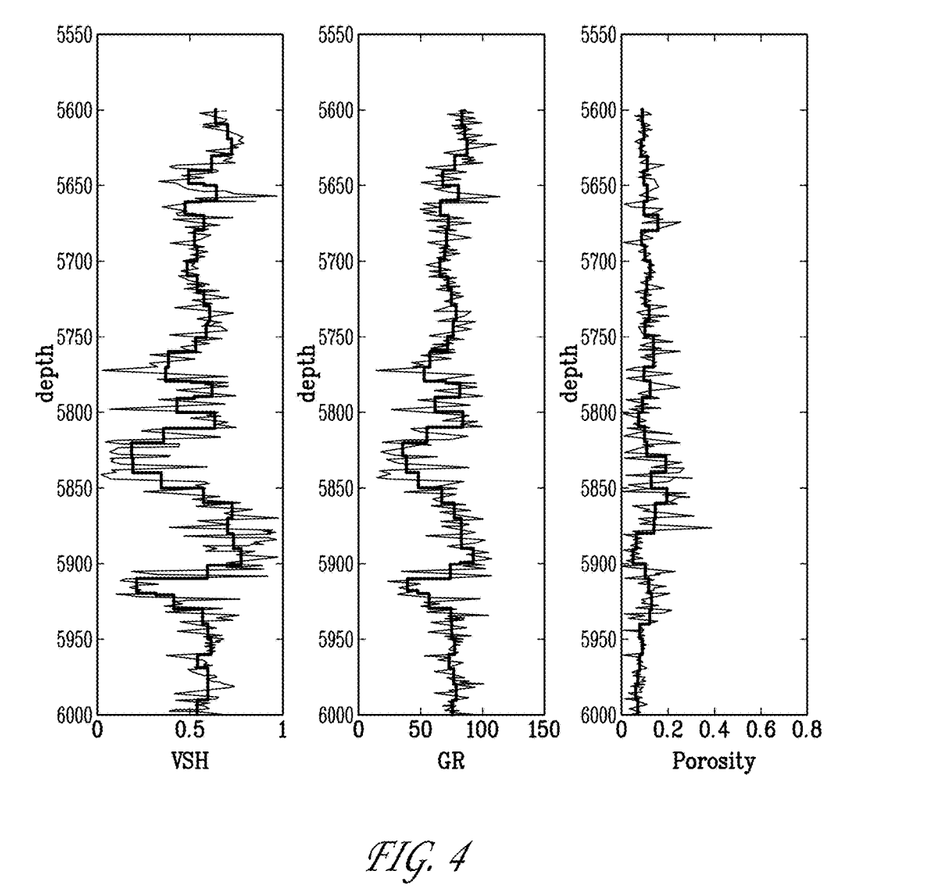
FIG. 4 presents a schematic view of an illustrative, nonexclusive example for the coarsening of log data for a set of forty zones, according to the present disclosure.

The coarsening procedure is illustrated in FIG. 4 for a set of 3 logs, specifically normalized volume of shale (VSH), gamma ray (GR) and porosity. In FIG. 4, the coarsened logs are shown as thick, substantially rectangular lines.

The number of zones to be used is determined using the following consideration. As the number of zones M decreases, the speed up is increased by a factor roughly given by 1/M. At the same time, however, the quality of the coarsened log, $s_c$, as compared to the original, un-coarsened, log s, decreases. A compromise can be reached by choosing a number of zones much larger than one, but much less that the maximum allowable number of zones $M_{max}$=N. Note that for M=$M_{max}$=N the coarsened profile and the original profile are identical, and, thus, no increase in speed is obtained.

The procedure of coarsening is denoted through the operator C(*; M), wherein the dependence of the coarsened log on the number of zones $$s_c = C(s;M) \quad (3)$$

is made apparent. Note that the application of the coarsening operator on a given log has the added benefit to remove unwanted noise which can be detrimental to determine the solution of the inverse problem. Therefore instead of Eq. (1), which contains unwanted noise through the input data, x, and the auxiliary data, z, we can consider the following inverse problem: find the set of optimal parameters for a coarse-grained equivalent rock physics model $$Y = R(x_c, \alpha, z_c) \quad (4)$$

for which the error E=E($x_c$,Y) is a minimum. Note that although the coarsening operator is linear, or approximately linear, the operator R(*) is not, and C(R(x,α,z); M) is not equal to R(C(x;M),α,C(z;M)). As may be appreciated, this is why the left-hand side of Eq. (4) is denoted Y and not $y_c$.

Note that for a given set of parameters, Eq. (1) involves N forward runs; that is, one forward run for each entry in the input logs, whereas Eq. (4) involves only M forward runs, given that the ratio N/M can be 100 or more, a two or more order of magnitude speed-up can be achieved. Nevertheless, this speed-up may not be sufficient for most applications. Therefore, using a direct inverse method (e.g., the simulated annealing method or the neural network method) may not be adequate for practical applications.

Disclosed herein is an alternative approach having no tuning parameters, making its applicability and general usability greater than other methods. The set of parameters to be determined a can be decomposed into Q subsets:

$$\alpha = \{\alpha_1, \alpha_2, \alpha_3, \alpha_Q\} \quad (4)$$

If the number of entries of a is d, then the number of entries for each subset is $\alpha_j$ as $d_j$ and $d_1+d_2+\ldots+d_Q=d$. A subspace $\Omega_j$ may be associated with dimension $d_j$ with each subset identified above.

Using this notation, the inverse problem is defined in the space Ω which is the union of all the subspaces.

$$\Omega = \Omega_1 \cup \Omega_2 \cup \ldots \cup \Omega_Q \quad (5)$$

This methods disclosed herein exploit the decomposition into subspaces suggested by Eq. (5). Specifically, one or more subspaces (s) may be considered and a crude inversion performed, while holding the remaining subspaces fixed. This may be referred to as a "local inversion." For example, if the local inversion pertains to a subspace with index k, then the remaining subspaces are left unchanged. That is, each subspace $\Omega_6$ for j≠k is held fixed during the local inversion.

The methods disclosed herein employ a sequence of such local inversions; the specific sequence is typically dependent on the rock physic models being considered. The choice of a sequence of local inversions is usually guided by the physics being modeled and in most situations involves first solving a mass balance equation for the constituents of the rock being modeled. The automation procedure disclosed herein is, however, not dependent on the sequence of the local inversions. As indicated hereinabove, various numerical procedures can be used to perform the local inversions, such Monte Carlo type methods or methods based on Bayesian inference.

One aspect of the automation procedure disclosed herein is with respect to numerical bounds of the parameters. While performing the inversion, values of each parameter of the rock physics model must be physically meaningful. Here, what must be enforced are (1) finite bounds of each parameter and (2) proper constraints among parameters.

As an example we consider the following set of parameters: the aspect ratio of the sand-related pores, $\alpha_s$, and the aspect ratio of the clay-related pores, $\alpha_c$. To be physically meaningful, both parameters must be in the range [0,1]. In addition, the aspect ratio of the clay-related pores must be, by definition, lower than the aspect ratio for the sand-related pores. Thus during the inversion the set of parameters {$\alpha_s$, $\alpha_c$} always satisfy the physical (joint) requirements of $$0 < \alpha_s < 1; 0 < \alpha_c < 1; \alpha_c < \alpha_s \quad (6)$$

Figure 5:
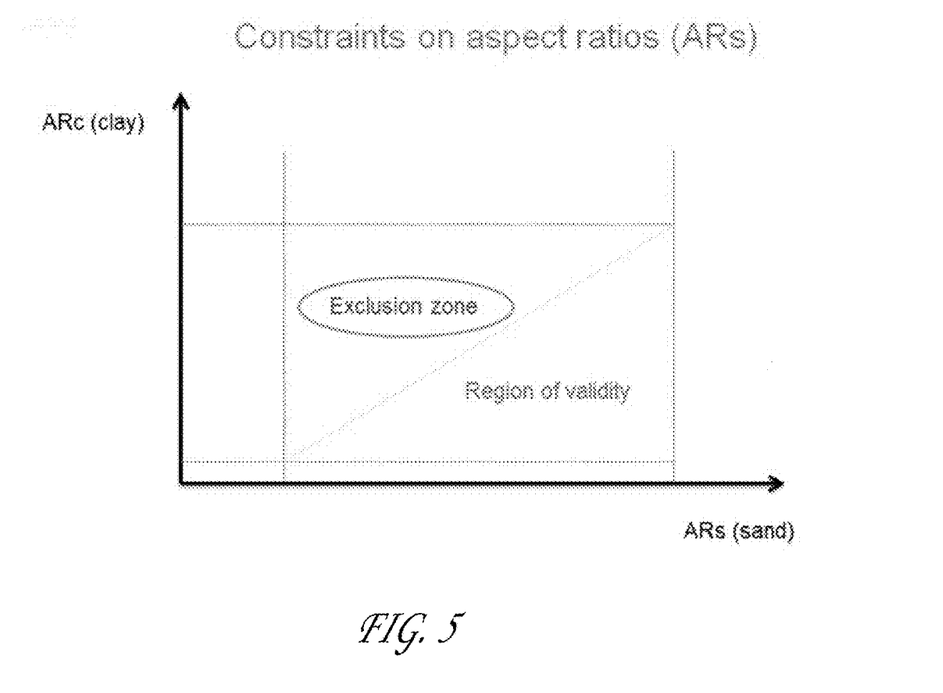
FIG. 5 presents a schematic view of an illustrative, nonexclusive example of the automation procedure disclosed herein can account for the presence of exclusion zones in a parameter space, for the subspace formed by the aspect ratios of sand and clay.

Similar bounds and constraints are enforced for the remaining parameters. The automation procedure disclosed herein accounts for the presence of exclusion zones in parameter space. This is illustrated in FIG. 5 for the subspace formed by the aspect ratios of sand and clay.

Example

Figure 6:
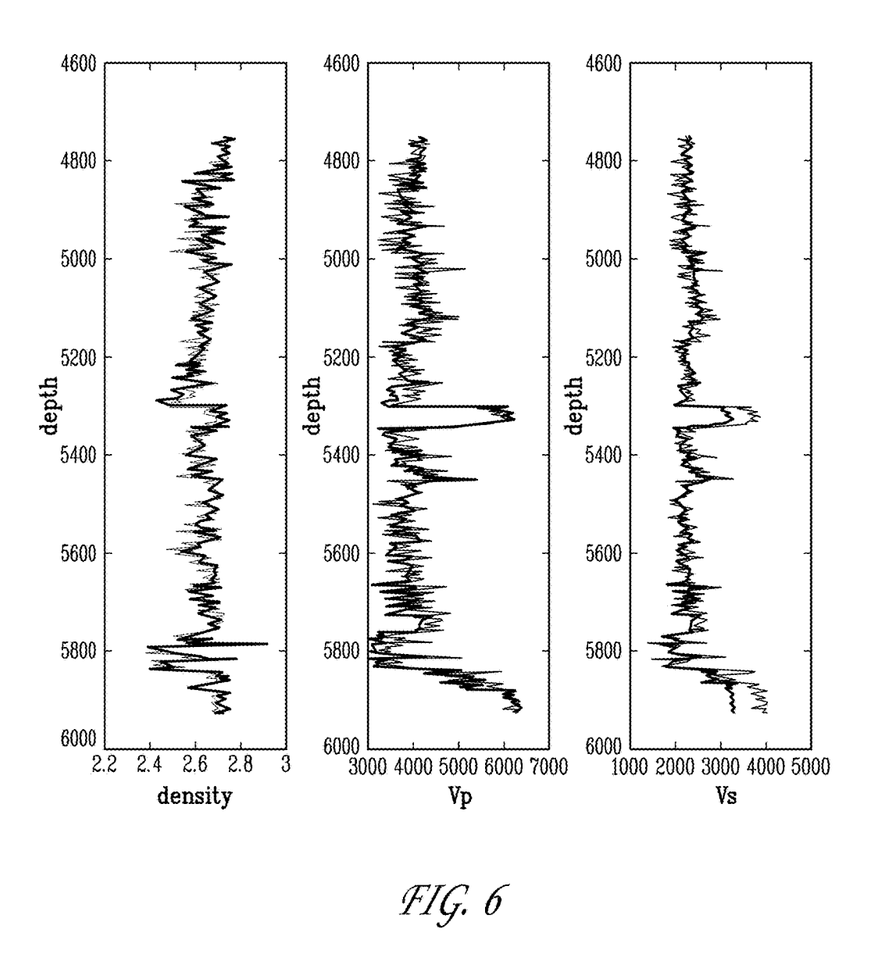
FIG. 6 presents a schematic view of an illustrative, nonexclusive example of a set of input logs superimposed over a set of computed logs, as obtained from an application of the present invention.

This example presents an illustration of the methods disclosed herein for the case where the set of input logs contains 3 elements. In this example, the automation procedure performs the inversion for a set of 3 computed, or synthetic, logs. Optimal parameters are found by efficiently minimizing the error for the difference between input and computed logs. This is illustrated in FIG. 6, where the input logs are shown in comparison to computed counterparts. In general, the error between input and computed logs is never exactly zero in view of the inherent, intrinsic noise due to the measurement errors from the logging tools.

As demonstrated, the methods disclosed herein provide an accurate method to determine rock mechanical properties based on a set of advanced rock physics, data from logging tools and an automation procedure. The methods are not specific to a particular rock physics model (e.g., sandstone, carbonate or shale gas) and can be extended to advanced rock physics models that may be developed in the future.

The methods disclosed herein may be used as a preprocessor for a host of applications in engineering (e.g., open-hole stability analysis of wellbores, sand control analysis in producing wells, well stimulation treatment for multiple zones, hydraulic fracturing analysis), in geosciences (e.g., the characterization of natural fractures in oil and gas reservoirs, large-scale geomechanical modeling) and in geophysics (e.g., petro-physical inversion using full-wave-field inversion data, seismic inversion for geological and geomechanical data, seismic well tie); the above list providing examples, without limitation.

All or a portion of the methods, systems and subsystems of the exemplary embodiments can be conveniently implemented using one or more general purpose computer systems, microprocessors, digital signal processors, microcontrollers, and the like, programmed according to the teachings of the exemplary embodiments disclosed herein, as will be appreciated by those skilled in the computer and software arts.

In view thereof, in one embodiment, there is provided a computer program product for automated rock physics modeling, the computer program performing the steps of: (a) pre-processing data obtained from a suite of logging tools over a range of depths; (b) determining a solution to an inverse problem associated with the rock physics model using the data from step (a), the solution including a list of optimal parameters; (c) performing a forward run of the rock physics model; and (d) computing a set of rock mechanical properties using the optimal parameters obtained in step (b), the computer program product including one or more computer readable instructions embedded on a tangible computer readable medium and configured to cause one or more computer processors to perform the steps described above and transmitting information relating to the steps described above over a communications link.

Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments disclosed herein can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of a form disclosed herein for performing all or a portion (if processing is distributed) of the processing performed in implementing the methods disclosed herein. Computer code devices of the exemplary embodiments disclosed herein can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments disclosed herein can be distributed for better performance, reliability, cost, and the like.

As stated above, the methods, systems, and subsystems of the exemplary embodiments can include computer readable medium or memories for holding instructions programmed according to the embodiments disclosed herein and for holding data structures, tables, records, and/or other data described herein. Computer readable medium can include any suitable medium that participates in providing instructions to a processor for execution. Such a medium can take many embodiments, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common embodiments of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

The disclosed methods and computer program products may be useful in association with the production of hydrocarbons, such as for use in planning the drilling and/or completion of a wellbore, or geological or stratigraphic modeling, or in reservoir modeling. Accordingly, it is within the scope of this disclosure to use or incorporate the teaching herein to be applied to or used in conjunction with modeling systems related to hydrocarbon production. For example, the disclosed methods may include the additional steps of using the computed set of rock mechanical properties in a system associated with the production of hydrocarbons. In other aspects, the disclosed methods may include the further step of producing hydrocarbons using a wellbore that was at least one of drilled and completed using a drilling or completion planning process that included the computed a set of rock mechanical properties.

In still other aspects, the disclosed processes and systems may also comprise any of various wellbore, reservoir or field computer programs or modeling systems that are useful as planning systems associated with the production of hydrocarbons that utilize or incorporate the computed set of rock mechanical properties, either directly or indirectly. Similarly, a wellbore useful in the production of hydrocarbons may be planned, drilled, and/or completed based at least in part upon modeling that uses the computed set of rock mechanical properties.

The embodiments disclosed herein, as illustratively described and exemplified hereinabove, have several beneficial and advantageous aspects, characteristics, and features. The embodiments disclosed herein successfully address and overcome shortcomings and limitations, and widen the scope, of currently known teachings with respect to the blending of agricultural products such as tobacco bales, lots or samples.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

In the event that any patents, patent applications, or other references are incorporated by reference herein and define a term in a manner or are otherwise inconsistent with either the non-incorporated portion of the present disclosure or with any of the other incorporated references, the non-incorporated portion of the present disclosure shall control, and the term or incorporated disclosure therein shall only control with respect to the reference in which the term is defined and/or the incorporated disclosure was originally present.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

INDUSTRIAL APPLICABILITY

The apparatus and methods disclosed herein are applicable to the oil and gas industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A computer-implemented method for automated rock physics modeling, comprising:
 (a) pre-processing log data obtained from a suite of logging tools and corresponding auxiliary information over a range of depth of a subterranean formation, the pre-processing including;
  (i) dividing the log data and the corresponding auxiliary information into zones within the range of depth,
  (ii) coarsening the log data and the corresponding auxiliary information by determining an average value for the log data and the corresponding auxiliary information for each zone to produce a coarsened log data and a coarsened corresponding auxiliary information over the range of depth;
 (b) solving an inverse problem associated with the rock physics model with a method comprising,
  (i) identifying a list of parameters associated with the range of depth within the subterranean formation,
  (ii) dividing the list of parameters into a set of at least two subgroups of parameters,
  (iii) perform a local inversion for each of the at least two subgroups of parameters identified in step (b)(ii) to obtain optimum values for all parameters belonging to a given subgroup,
  (iv) collect the optimal values of parameters obtained in step (iii) to determine the optimal values for the list of parameters identified in step (b)(i) by comparing the local inversions from step (b)(iii) with the pre-processed log data from step (a) to identify the subgroup of parameters as the optimum set of parameters for use in a forward run of the rock physics model; and (c) computing a set of rock mechanical properties, comprising
(i) a forward run of the rock physics model using the optimal parameters obtained in step (b)(iv) to calculate at least one of density log, a compressional velocity log and a shear velocity log,
(ii) calculating an optimized set of rock mechanical properties for the range of depth use the at least one of the calculated density, compressional velocity and shear velocity logs of step (c)(i) in a rock physics model.

2. The method of claim 1, wherein the data obtained from the suite of logging tools form a set of logs that include one or more of bulk density, total organic content (TOC), porosity, normalized volume of shale, shear wave transit time, and water saturation.

3. The method of claim 2, wherein the set of logs form auxiliary information for the rock physics model.

4. The method of claim 3, wherein the step of pre-processing data obtained from the suite of logging tools includes determining which depth ranges possess all required auxiliary information for the rock physics model.

5. The method of claim 4, wherein the step of pre-processing data obtained from the suite of logging tools includes a data filtering step.

6. The method of claim 5, wherein the step of pre-processing data obtained from the suite of logging tools includes the step of coarsening the auxiliary information and the data obtained from the suite of logging tools to decrease the time required to conduct step (b).

7. The method of claim 1, wherein the rock physics model defines an associated inverse problem.

8. The method of claim 7, wherein the solution of the inverse problem defines a set of optimal parameters.

9. The method of claim 8, wherein prior to step of determining a solution to the inverse problem associated with the rock physics model, the set of optimal parameters is divided into subsets.

10. The method of claim 9, wherein the number and choice of parameters belonging to each subset is selected with reference to the physics of the rock physics model.

11. The method of claim 9, wherein the number and choice of parameters belonging to each subset is selected by a computer implemented dynamic, numerical process.

12. The method of claim 9, wherein the step of determining a solution to the inverse problem associated with the rock physics model is separately conducted on each subset of parameters to form a set of local inversions.

13. The method of claim 12, wherein the step of determining a solution to the inverse problem associated with the rock physics model comprises an inversion method selected from a Monte Carlo based method, or a Bayesian-type method, or a combination of thereof.

14. The method of claim 13, wherein a pre-defined sequence of local inversions is conducted to obtain an overall solution to the inverse problem.

15. The method of claim 1, wherein the forward run of the rock physics model is conducted using a set of optimal parameters and auxiliary information that has not been subjected to a step of coarsening.

16. The method of claim 1, wherein the rock mechanical properties are computed at all depth ranges having auxiliary information.

17. The method of claim 1, wherein the rock mechanical properties include Poisson ratio, bulk modulus and shear modulus.

18. The method of claim 1 further comprising using the computed set of rock mechanical properties in a system associated with the production of hydrocarbons.

19. The method of claim 1, further comprising the step of producing hydrocarbons using a wellbore that was at least one of drilled and completed using a drilling or completion planning process that included the computed set of rock mechanical properties.

20. A computer program product for automated rock physics modeling, a computer program performing the steps comprising:
(a) pre-processing log data obtained from a suite of logging tools and corresponding auxiliary information over a range of depth of a subterranean formation, the pre-processing including;
(i) dividing the log data and the corresponding auxiliary information into zones within the range of depth,
(ii) coarsening the log data and the corresponding auxiliary information by determining an average value for the log data and the corresponding auxiliary information for each zone to produce a coarsened log data and a coarsened corresponding auxiliary information over the range of depth;
(b) solving an inverse problem associated with the rock physics model with a method comprising,
(i) identifying a list of parameters associated with the range of depth within the subterranean formation,
(ii) dividing the list of parameters into a set of at least two subgroups of parameters,
(iii) perform a local inversion for each of the at least two subgroups of parameters identified in step (b)(ii) to obtain optimum values for all parameters belonging to a given subgroup,
(iv) collect the optimal values of parameters obtained in step (iii) to determine the optimal values for the list of parameters identified in step (b)(i) by comparing the local inversions from step (b)(iii) with the pre-processed log data from step (a) to identify the subgroup of parameters as the optimum set of parameters for use in a forward run of the rock physics model;
(c) computing a set of rock mechanical properties, comprising,
(i) a forward run of the rock physics model using the optimal parameters obtained in step (b)(iv) to calculate at least one of density log, a compressional velocity log and a shear velocity log,
(ii) calculating an optimized set of rock mechanical properties for the range of depth use the at least one of the calculated density, compressional velocity and shear velocity logs of step (c)(i) in a rock physics model; and
(d) the computer program product including one or more computer readable instructions embedded on a tangible computer readable medium and configured to cause one or more computer processors to perform the steps described above and transmitting information relating to the steps described above over a communications link.

21. The computer program product of claim 20, wherein the data obtained from the suite of logging tools form a set of logs that include one or more of bulk density, total organic content (TOC), porosity, normalized volume of shale, shear wave transit time, and water saturation.

22. The computer program product of claim 21, wherein the set of logs form auxiliary information for the rock physics model.

23. The computer program product of claim 22, wherein the step of pre-processing data obtained from the suite of logging tools includes determining which depth ranges possess all required auxiliary information for the rock physics model.

24. The computer program product of claim 23, wherein the step of pre-processing data obtained from the suite of logging tools includes a data filtering step.

25. The computer program product of claim 24, wherein the step of pre-processing data obtained from the suite of logging tools includes the step of coarsening the auxiliary information and the data obtained from the suite of logging tools to decrease the time required to conduct step (b).

26. The computer program product of claim 20, wherein the rock physics model defines an associated inverse problem.

27. The computer program product of claim 26, wherein the solution of the inverse problem defines a set of optimal parameters.

28. The computer program product of claim 27, wherein prior to step of determining a solution to the inverse problem associated with the rock physics model, the set of optimal parameters is divided into subsets.

29. The computer program product of claim 28, wherein the number and choice of parameters belonging to each subset is selected with reference to the physics of the rock physics model.

30. The computer program product of claim 28, wherein the number and choice of parameters belonging to each subset is selected by a computer implemented dynamic, numerical process.

31. The computer program product of claim 28, wherein the step of determining a solution to the inverse problem associated with the rock physics model is separately conducted on each subset of parameters to form a set of local inversions.

32. The computer program product of claim 31, wherein the step of determining a solution to the inverse problem associated with the rock physics model comprises an inversion method selected from a Monte Carlo based method, or a Bayesian-type method, or a combination of thereof.

33. The computer program product of claim 32, wherein a pre-defined sequence of local inversions is conducted to obtain an overall solution to the inverse problem.

34. The computer program product of claim 20, wherein the forward run of the rock physics model is conducted using a set of optimal parameters and auxiliary information that has not been subjected to a step of coarsening.

35. The computer program product of claim 20, wherein the rock mechanical properties are computed at all depth ranges having auxiliary information.

36. The computer program product of claim 20, wherein the rock mechanical properties include Poisson ratio, bulk modulus and shear modulus.

37. The computer program of claim 20, further comprising a planning system associated with the production of hydrocarbons that uses the computed set of rock mechanical properties.

38. The computer program of claim 20, further comprising a wellbore associated with the production of hydrocarbons that is at least one of drilled and completed using the computed set of rock mechanical properties.

* * * * *